Aug. 15, 1967  W. S. McCAUGHEY  3,336,564
FLAT CONDUCTOR CABLE CONNECTOR
Filed July 7, 1965  3 Sheets-Sheet 2

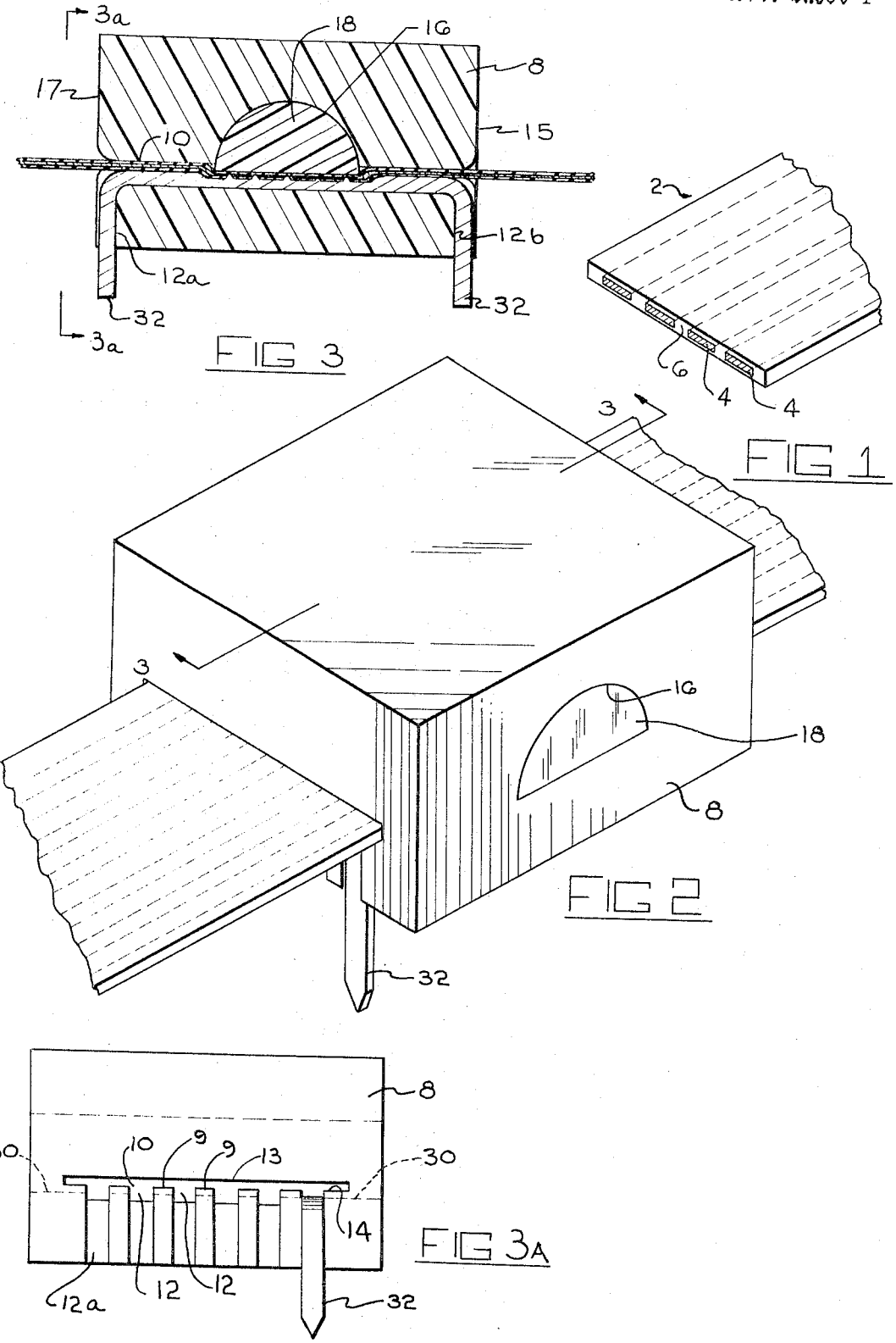

Aug. 15, 1967   W. S. McCAUGHEY   3,336,564
FLAT CONDUCTOR CABLE CONNECTOR
Filed July 7, 1965   3 Sheets-Sheet 3

United States Patent Office 3,336,564
Patented Aug. 15, 1967

1

3,336,564
FLAT CONDUCTOR CABLE CONNECTOR
William Stephen McCaughey, Camp Hill, Pa., assignor to
AMP Incorporated, Harrisburg, Pa.
Filed July 7, 1965, Ser. No. 470,136
4 Claims. (Cl. 339—99)

The invention relates to devices for making electrical connections to the conductors in a flat conductor cable.

An object of the invention is to provide an improved means for making electrical connections to flat conductor cables. A further object is to provide a connecting device which does not require stripping of the insulation from the cable. A still further object is to provide a connecting device which can be applied to the cable intermediate its ends thereby to make tap-type or branch connections with the conductors of the cable. A further object is to provide a connecting device for flat conductor cable which can be used to electrically connect the conductors of the cable to a variety of types of external conductors such as conventional wires, conventional socket-type contact terminals, the conductors on a printed circuit board, etc.

These and other objects of the invention are achieved in a preferred embodiment comprising an insulating block having an opening extending therethrough for reception of the cable, the cross-section of this opening being dimensioned to receive the cable so that the cable can be threaded through the block. A plurality of grooves or slots are provided on one side of this opening for the reception of elongated contact bars, the arrangement being such that the contact bars can be inserted into the block and will extend beside, and parallel to, the conductors of the cable after insertion. These contact bars are provided with a plurality of insulation penetrating protrusions intermediate their ends which are disposed against the cable. A cavity extends through the block transversely of the axis of the cable-receiving opening. This cavity intersects the cable-receiving opening intermediate its ends and is adapted to receive a clamping member which, upon insertion, presses the cable against the contact protrusions of the contact bars to establish the electrical connection between the bars and the conductors of the cable.

The contact bars can be electrically connected to external circuitry in any desired manner. For example, portions of the contact bars which project beyond the insulating block can have extraneous conductors secured thereto with clip-type connections or by wrapping techniques. The external portions of the bars can also be utilized as contact pins adapted to enter contact sockets contained in a suitable multi-contact connector.

In the drawing:

FIGURE 1 is a perspective view of a short section of flat conductor cable;

FIGURE 2 is a perspective view of one form of connecting device in accordance with the invention;

FIGURE 3 is a sectional view taken along the lines 3—3 of FIGURE 2 and showing the manner in which the contact bars are electrically connected to the conductors of the cable;

FIGURE 3A is an end view of the connecting device of FIGURE 2 taken along the lines 3A—3A of FIGURE 3;

2

Figure 6:
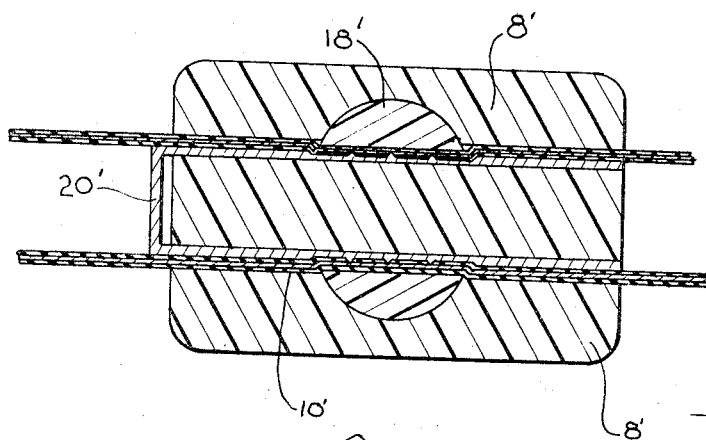
Figure 5:
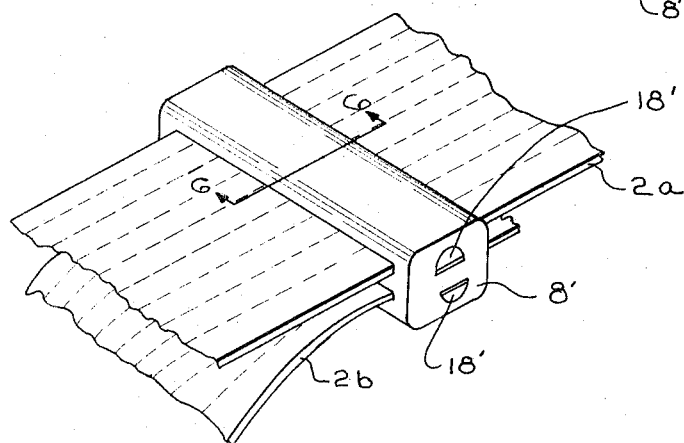
Figure 7:
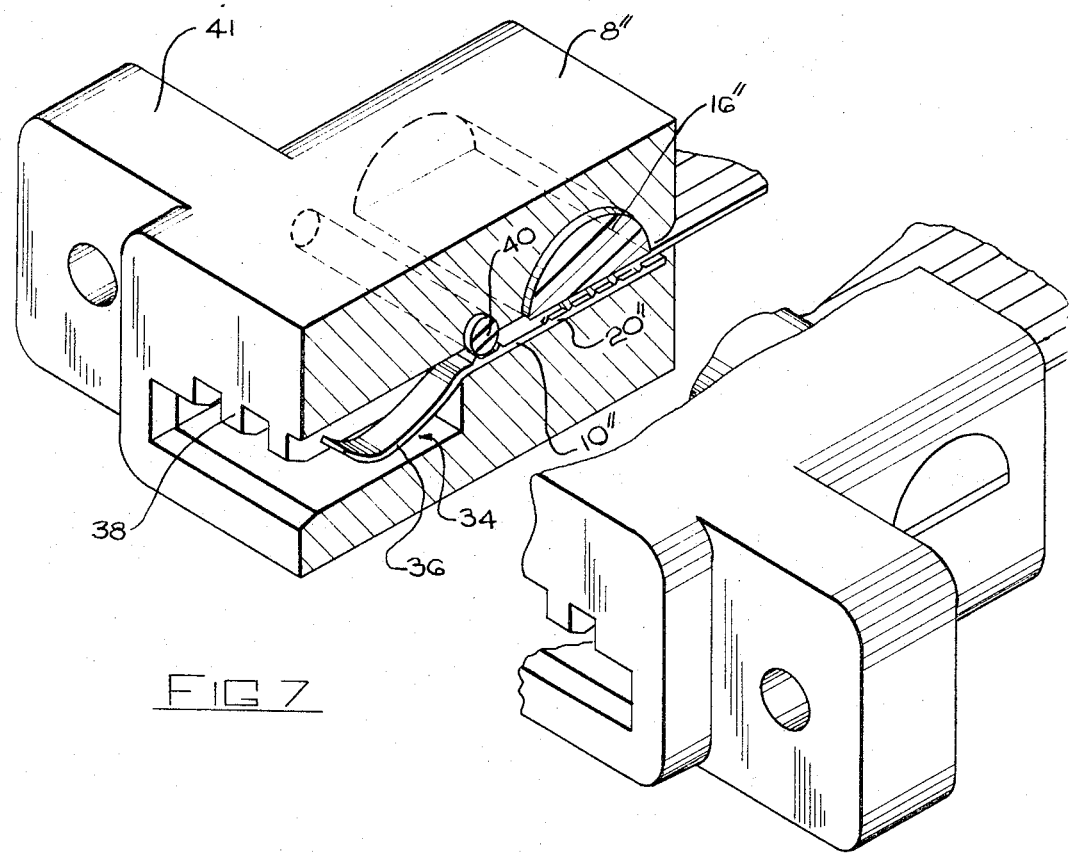
Figure 8:
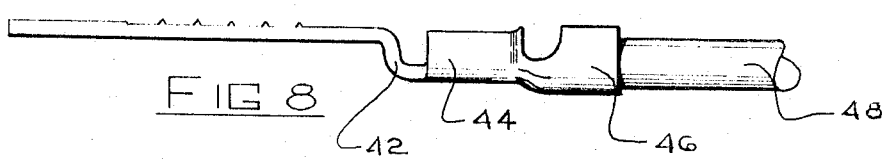
Figure 9:
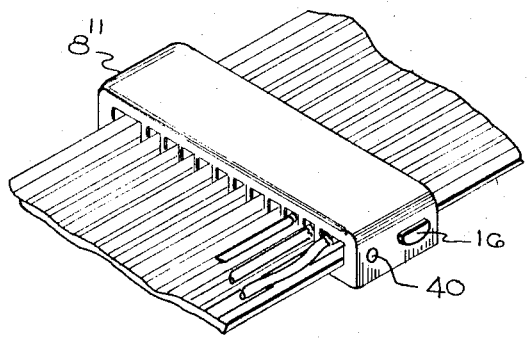

FIGURE 5 is a perspective view of an alternative embodiment;

FIGURE 6 is a view taken along the lines 6—6 of FIGURE 5;

FIGURE 7 is a perspective view, with parts broken away, of another alternative connector in accordance with the invention adapted to make electrical connections between the conductors of a flat conductor cable and the conductors of a printed circuit board;

FIGURE 8 is a perspective view of an alternative form of contact member intended for use with the embodiment of FIGURE 9; and FIGURE 9 shows a further embodiment comprising a connector adapted to make electrical connections between the conductors of a flat conductor cable and a plurality of conventional wires.

A typical flat conductor cable 2 comprises a plurality of ribbon-like conductors 4 extending parallel to each other and contained within a relatively thin strip 6 of suitable flexible insulating material such as Mylar film (polyethylene terephthalate). Cables of this type have been known for several years but their use has been somewhat restricted because of the lack of effective means for making connections to the conductors quickly and effectively.

Figure 4:
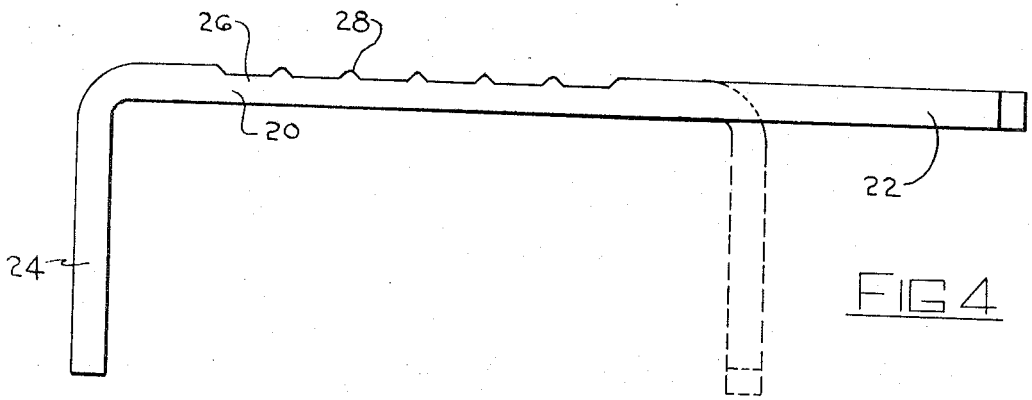
FIGURE 4 is a side view of a typical contact bar used in the practice of the invention.

Referring to FIGURES 2–4, a connecting device in accordance with the invention may comprise a block 8 of suitable firm insulating material such as diallyl phthalate having a relatively elongated rectangular opening 10 extending therethrough, the cross-section of this opening conforming to, and being slightly larger than, the cross-section of the cable 2 so that the cable can be threaded through the opening as shown in FIGURES 2 and 3. A plurality of parallel slots or grooves 12 are provided on one side 14 of the opening, these slots extending parallel to the axis of the opening and being spaced apart by a distance substantially equal to the distance between the axes of adjacent conductors 4 of the cable. The ends 15, 17 of the block are provided with slots 12a, 12b on one side of the opening 10 in alignment with the slot 12.

A semi-cylindrical cavity 16 extends transversely from one side of the block 8 to the other side and intersects the opening 10 intermediate its ends as best shown in FIGURE 3. It will thus be apparent that when the flat conductor cable 2 is threaded through the block, an intermediate portion thereof will be exposed in the cavity 16.

Electrical contact with the conductors of the cable is made by means of contact bars 20 (FIGURE 4) of suitable conductive metal which, in the disclosed embodiment, are of rectangular cross-section and dimensioned to fit relatively snugly in the slots 12. The contact bar 20 shown has one end 22 extending straight from the center portion of the bar while its other end 24 is bent through an angle of 90°. This bar can thus be inserted into any one of the slots 12 from one side thereof and after the end 22 is bent through an angle of 90°, the bar will be retained in its slot.

A center portion of the contact bar is milled as shown at 26 to produce a plurality of protrusions 28 spaced apart along the length of the bar. The location of these protrusions relative to the ends of the bar is such that after insertion, the protrusions 28 will be disposed beneath the portion of the flat conductor cable which extends through the cavity 16.

A pressure-applying or clamping member 18 conforming relatively closely to the cross-section of the cavity 16 is inserted into the cavity and over the upper surface of the cable. This clamping member is guided, during insertion, by the floor portions 30 of the cavity on each side of the opening 10 and its two ends are preferably chamfered to facilitate insertion into the cavity 16. Upon insertion of the clamping member, the cable is forced against the protrusions 28 of the flat conductor cable to establish electrical contact with the conductors of the cable. Insertion of the pressure-applying member also has the effect of pressing the cable against the surfaces 9 which separate the slots 12 thus clamping the cable independently of the engagement of the protrusions 28 with the conductors of the cable. This clamping of the cable provides a strain relief which transmits tensile forces from the cable to the block without disturbing the electrical contact between the protrusions and the conductors in the cable.

When the cable is forced against the protrusions 28, a relatively high pressure is imposed on the cable immediately adjacent to the apices of the protrusions 28 which results in a cold flow of plastic from the area immediately adjacent to the apices on both sides of the individual conductors. As a result of this flow, the protrusions 28 are brought into contact with the individual conductors of the cable and are held against the cable constructors by the wedge member 18. It will be noted that several protrusions 28 are provided on each contact bar 20 so that a high degree of redundancy is achieved for the contact with each conductor. In the preferred embodiment, the protrusions do not penetrate the conductors of the cable but are forced against the surface of the cable. This preferred arrangement permits relatively wide manufacturing tolerances in the cable and the connector parts so that good electrical results can be obtained consistently. It should also be noted that as the clamping member 16 is inserted, conductors are forced against the clamping bars one at a time rather than simultaneously. The force required to insert the clamping member is thus not excessive.

For best results, it has been found advantageous to have the apices of the protrusions 28 somewhat rounded as viewed in cross-section in order to achieve contact with the conductors without penetration of the connectors themselves by the protrusions.

The block 8 can take a variety of forms other than shown. For example, the block can be made in two sections adapted to be assembled to the cable intermediate its ends. The projecting ends of the bars 20 can be electrically connected to external conductors in any desired manner. For example, these ends can be inserted into contact sockets in a conventional multi-contact electrical connector. Alternatively, individual wires can be connected to these ends by clip-type and wrap-type techniques.

FIGURES 4 and 5 show an alternative embodiment of the invention which is adapted to make electrical contact between corresponding conductors of a pair of cables 2a, 2b. In this embodiment, the block 8' has a pair of openings 10' extending therethrough for reception of the two cables. The contact bars 20' are substantially U-shaped so that each of the legs of the bar can be inserted into a slot similar to the slots 12 of the openings 10'. The legs of the contact bar are connected to the conductors of the cable by means of a pair of pressure-applying members 18' each of which is fitted into a cavity 16'. The manner in which electrical contact is established is substantially the same in the embodiment of FIGURE 4 as in the previously described embodiment.

The embodiment of the invention shown in FIGURE 7 is adapted to be used to make disengageable connections between the conductors of a flat conductor cable and a printed circuit board or the like. The block 8" is substantially similar to the previously defined blocks in that it has a cavity or opening extending therethrough for reception of the end of the cable, a plurality of slots on one side of the opening for reception of the contact members 20" and a clamping member 16" corresponding to the previously described clamping member 16. The block 8" may have laterally extending ears 41 by means of which it can be mounted on a panel and has an enlarged trough-like opening 34 on its left-hand side which communicates with the cable-receiving opening 10". The contact members 20" have arcuate contact fingers 36 on their ends which project into the recess 34. Ribs 38 are advantageously provided on one side of the opening 34 and are spaced apart by an amount such that a contact portion 36 of a contact member is disposed between each pair of ribs. Since the contact member is comparatively straight, a locking pin 40 is provided in the block 8" which extends through a cylindrical opening in the block adjacent to the opening 10". The pin 40 lodges between an adjacent pair of the protrusions 28 of each contact member thereby to retain the contact members in the block.

Electrical contact between the contact members 10" and the conductors of the cable is, of course, established as previously described. The printed circuit card is inserted into the trough-like cavity of the block and the conductors on the surface of the card are engaged with the contact arms 36.

FIGURES 8 and 9 show a further embodiment of the invention 8''' by means of which conventional wires 48 can be electrically connected to the conductors of a flat cable either at the end or intermediate the ends of the cable. The contact bar has an offset 42 intermediate its ends and a pair of ferrule portions 44, 46 which are crimped onto the conducting core and the insulation respectively of the wire 48. The block 8 in this instance will have suitable cavities on its left-hand side and adjacent to the cable-receiving opening which are adapted to receive the ferrule portions 44, 46 of the contact member. As with the embodiment of FIGURE 7, a locking pin may be provided to retain contact members in the block.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

I claim:

1. A connecting device for making electrical connections to conductors in flat conductor cable, said device comprising, an insulating block having an opening extending therethrough, a plurality of grooves on one side of said opening, said grooves being spaced-apart by a distance substantially equal to the spacing between the conductors of said cable, contact members of conductive metal adapted to be snugly received in said grooves, a plurality of protrusions of uniform height having rounded ends extending from each of said contact members, a cavity extending through said block transversely of, and intersecting, said opening, and clamping member means insertable into said opening for forcing a cable extending through said opening against said protrusions and against the surface portions of said opening between said grooves whereby, the insulating film of said cable adjacent to said protrusions is axially extruded and said protrusions establish electrical contact with the conductors of said cable, and portions of said cable between the conductors thereof are clamped against said surface portions between said grooves to mechanically clamp said cable to said block.

2. A device as set forth in claim 1 wherein said block has two cable-receiving openings extending therethrough, said openings being provided with grooves on their proximate sides, said contact members each being substantially U-shaped and having end portions adapted to enter the one groove in each opening, said device being adapted to form connections between two parallel cables.

3. A device as set forth in claim 1 wherein said contact members have means on one end thereof for attachment to a wire, said device being adapted to make electrical connections between the conductors of said cable and wires.

4. A device as set forth in claim 1 wherein said contact members have resilient contact arms at one end thereof, said block having a trough-like opening dimensioned to receive a printed circuit board or the like, said resilient contact arms extending into said trough-like openings whereby upon insertion of a printed circuit board into said opening, the conductors of said cable are electrically connected to conductors on said board.

References Cited

UNITED STATES PATENTS

| | | | |
|---|---|---|---|
| 3,201,744 | 8/1965 | Dean | 339—97 |
| 3,252,126 | 5/1966 | Brown | 339—99 |

MARVIN A. CHAMPION, *Primary Examiner.*

EDWARD C. ALLEN, *Examiner.*

J. H. McGLYNN, *Assistant Examiner.*